Sept. 27, 1960 W. P. LEAR ET AL Re. 24,880

RATE GYROSCOPE WITH TORSIONAL SUSPENSION

Original Filed Oct. 23, 1951

INVENTORS:
William P. Lear and
Thomas Barish,
BY
Howard S. Cherrefe
Attorney

United States Patent Office

Re. 24,880

Reissued Sept. 27, 1960

24,880

RATE GYROSCOPE WITH TORSIONAL SUSPENSION

William P. Lear, Santa Monica, Calif., and Thomas Barish, Shaker Heights, Ohio, assignors to Lear, Incorporated, Grand Rapids, Mich., a corporation of Illinois Original No. 2,800,024, dated July 23, 1957, Ser. No. 252,736, Oct. 23, 1951. Application for reissue July 21, 1959, Ser. No. 828,676

12 Claims. (Cl. 74—5)

Matter enclosed in heavy brackets [ ] appears in the original patent but forms no part of this reissue specification; matter printed in italics indicates the additions made by reissue.

This invention relates to a mounting for a gyroscope gimbal. More specifically it has relation to a gyroscope in which one or more of the gimbals is restricted in the amount of angular displacement on its axis.

An example of a gyroscope with which the invention may be incorporated is the so-called rate gyroscope utilized in aerial navigation and cooperable with a vertical gyroscope in a manner to be explained. When utilizing an automatic pilot which depends upon a single vertical gyroscope for translating errors in pitch and roll into a voltage forming an input signal to the amplifiers driving the surface-controlling servomotors the vertical gyroscope is, in most modern instruments, maintained to true vertical by means of a gravity-responsive electrolytic switch. Such switch contains a plurality of contacts and an electrically conductive fluid defining with the switch casing a bubble. The circuit controlled through the contacts is energized or deenergized in accordance with the position of the bubble. For a typical switch of this character reference may be had to U.S. Letters Patent No. 2,720,569, granted October 11, 1955, to John F. Schoeppel et al. The circuit, including the electrolytic switch, is connected to a source of power and to torque motors arranged to maintain the gyro to the reference vertical by driving the gimbals thereof.

When going into a turn it becomes necessary to eliminate erection of the gyroscope insofar as concerns the roll axis of the airplane, for otherwise, the gyroscope will be erected to an apparent vertical, which is no longer in the vertical fore and aft plane of the aircraft and, by such erection to an apparent vertical, false indications will result.

In order to open the circuit from those contacts of the electrolytic switch which control erection in the "roll" sense a so-called "rate" gyroscope is often employed. This instrument comprises a housing containing the gyroscope rotor, the housing being rotatably supported on a frame secured to the aircraft in such position that the gyroscope will sense the centrifugal force corresponding to a given rate of turn to which the aircraft is then subjected and, by means of a suitable pickoff incorporated between the housing and the frame, will provide a signal which contains a rate component of such magnitude and phase as to effect opening of the roll erection circuit.

However the rate gyroscope should not be suspended so freely as to sense all random displacements of the airplane on its roll axis, since under those circumstances the gyroscope will be effective to open and close the roll erection circuit in compliance with every such displacement and thereby result in erratic performance of the autopilot system. On the other hand a sustained displacement above a minimum predetermined norm and occurring about the roll axis, as would be the case in a turn, should be effective to cut out roll erection during the turn, and to re-establish the circuit upon resumption of level flight.

Accordingly we have found that the system for suspending the single gimbal, i.e. housing, of the rate gyroscope must possess a degree of rigidity which will render the gimbal relatively unresponsive to minor fluctuations of the aircraft on its roll axis, but will allow a sensible displacement for such rate of turn as would cause false erection of the gyroscope and accordingly result in disabling the roll erection circuity.

In view of the foregoing a principal object of our invention is to provide in a rate gyroscope semi-rigid means for mounting the rotor gimbal for permitting a limited degree of angular displacement thereof.

Another object is to provide a pair of semi-rigid mountings for the gimbal of a gyroscope and an electrical pickoff at one end of the gimbal, the mounting at the pickoff end being substantially more rigid than that at the opposite end.

A further object is to provide mounting means as aforesaid which includes a torsionally deformable element.

Still a further object is to provide means as aforesaid which is adaptable to mounting a gimbal within a gimbal, with or without pickoffs associated with either gimbal.

Another object resides in providing torsionally bidirectionally deformable elements as the rotational support for a gyroscope gimbal, in order that movement of the gimbal on its axis may occur in either sense against the same amount of resilient opposing force.

Still another object is to provide a semi-rigid mounting for the gimbal of a gyroscope which, while permitting proper displacement of the gimbal in response to change in attitude of the craft, provides suitable protection against misadjustment in the pickoff due to shock.

Other objects will appear from the following description, taken with the appended drawing, in which latter:

Figure 1:
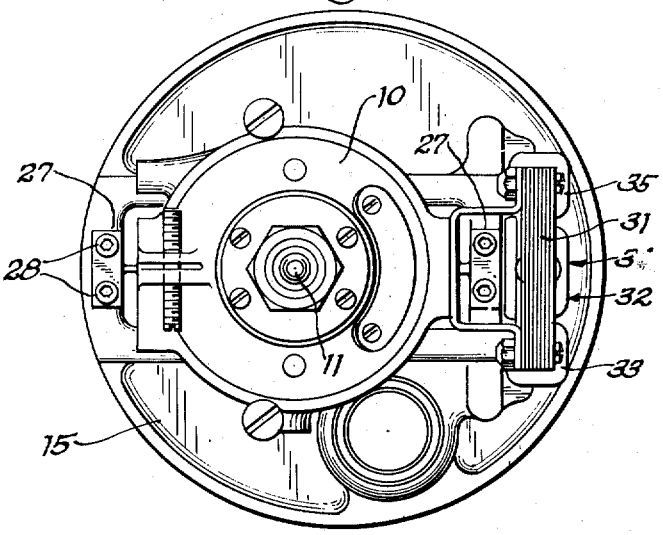
Fig. 1 shows a top plan view of a rate gyroscope embodying the invention.

Broadly considered the invention improvement contemplates the securement intermediate the fixed framework of the instrument and the rotor housing, i.e. gimbal, of an element which possesses a predetermined torsional resiliency but no perceptible longitudinal deflection under the loads encountered and which element serves as one of the supporting members of the gimbal. Preferably the supporting members, if more than one is employed, are of similar construction, and include a necked portion so designed as to permit limited torsional deformation of the member about an axis corresponding to what may be termed the principal rotational axis of the gimbal, such axis lying in a plane including the axis of the rotor and perpendicular to said latter axis. However lateral deflection of the support member is maintained at an absolute minimum consistent with the desired torsional characteristics, thus providing radial support for the gimbal and the elements carried thereby. When utilizing an E–I pickoff for translating the angular displacement of the gyroscope into an electrical signal having a magnitude and phase corresponding to the magnitude and direction of the angular displacement it has been found preferable to provide that the supporting member adjacent the pickoff be stiffer than the opposite member. In this way the possibility of disturbing the initial, critical adjustment of the pickoff is materially reduced.

In another aspect the invention contemplates securement of the supporting members to the frame by means of a clamping arrangement so constructed that by tightening or loosening a clamping screw micrometric angular displacement of the supporting member may be effected, and the null position of the pickoff rapidly and accurately achieved.

As an alternative it is within contemplation to provide a torsionally resilient but laterally rigid support member which includes a plurality of similarly functioning sections, the number and configuration whereof depending upon the characteristics of the instrument involved.

Where, in this description and the claims, we refer to the supporting members as laterally rigid, we intend to mean that the gyroscope gimbal and the parts carried thereby are substantially restrained from angular displacement in any direction which is not tantamount to rotation about the axis of the supporting members, since such displacement is without significance in connection with a gyroscope having only one degree of freedom, and may provide spurious indications by precessive effects. However, in this connection it is not intended to limit the scope of the invention to one-gimbal instruments, since the same are capable of being embodied in gimbal mountings generally. And, when we use the phrase "torsionally deformable," we intend to refer to a member which possesses a predetermined capacity to be twisted about its longitudinal axis, and incorporating sufficient elasticity to be self-restoring to an intial position. It will be understood that the design is such that under all working conditions of the instrument the elastic limit of the material is not exceeded.

Referring to the drawings a gimbal in the form of a housing 10 is provided with bearings 11—11 for supporting the rotor 12 of the gyroscope. In the chosen example the rotor is arranged as the armature of an electric motor, the stator being indicated at 14. It will be understood that other motive means may be employed, e.g. compressed air.

Figure 5:
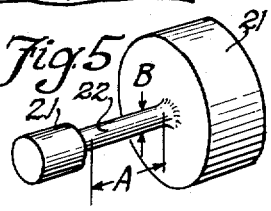
Fig. 5 shows an enlarged detail of one of the torsionally deformable mounting members.

For supporting the gimbal 10 on the base or framework 15 there is provided a pair of laterally rigid but torsionally deformable members 17 and 18 (see Fig. 5), each comprising an enlarged portion 21, preferably cylindrical, and hereinafter referred to as the support flange, a narrowed portion 22 and 23, referred to as the neck, and a head 24, also preferably cylindrical.

Each flange 21 is press-fitted into a suitable recess 25 in each side of the housing, these being the same and disposed at each end of an axis intersecting the axis of the rotor 12 and perpendicular thereto. Each head 24 (Fig. 4) is rigidly clamped by means of a bar 27 and screws 28—28 to a post 29 upstanding from the framework 15, and regarding which further elucidation will be set forth hereinafter.

Members 17 and 18 are one-piece construction, preferably chrome-vanadium steel, e.g. SAE 6150, and thus capable of being heat treated to provide the desired resiliency in torsion together with stiffness in deflection. Inasmuch as the preferred form of pickoff used for translating the deviation of the gyroscope into an electrical signal is extremely sensitive to relatively small angular movements of the gimbal, the gimbal supports may be made sufficiently rigid as to have a natural frequency of vibration well above those frequencies which are likely to be encountered. Furthermore the bending deflection must be kept as small as possible. Accordingly the problem becomes one of providing a support member which is comparatively short in its active portion, while possessed of that degree of torisional deformability which will provide a sufficient output signal from the pickoff.

Another feature of importance is the provision of a support member at that side of the gimbal nearest the pickoff which is substantially more rigid than the opposite member. Then, if the framework flexes under the stresses to which it may be subjected, either as a result of mishandling or deformation of the surface to which the framework is secured, or as a result of temperature changes, the possibility of disturbing the pre-set adjustment of the pickoff is considerably minimized.

Accordingly assuming a gyroscope having an angular momentum of say 1,590,000 grams/cm.$^2$/sec. and a member of chrome-vanadium steel, SAE 6150, the length A of the straight portion of the neck 22 may be on the order of 0.120″ for both parts 17 and 18, whereas the diameter B of the neck may be on the order of 0.0413″ and 0.043″ respectively, thereby providing a stiffer spring factor at the pickoff end of the gimbal.

Additionally the support members of the invention exert a centering action upon the gimbal, i.e. any influence tending to displace the gimbal in a lateral sense is counteracted by the spring action. However to provide such response the spring cannot be too long. For a gyroscope having the general characteristics noted a spring as specified has been found capable of supplying not only the required torsional resiliency but also the lateral recovery.

Figure 6:
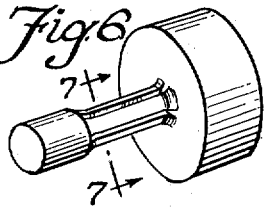
Fig. 6 is a perspective view in detail of an alternative form of support member.
Figure 2:
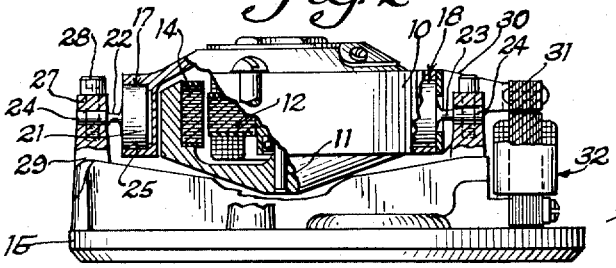
Fig. 2 shows a front elevational view thereof, and partly sectioned.
Figure 7:
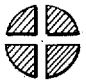
Fig. 7 is a cross-section taken on the line 7—7 of Fig. 6.

Alternatively it is within contemplation to provide a spring which is in multiple, e.g. as shown in Figs. 6 and 7. This construction is characterized by relatively higher resistance to lateral deflecting forces in proportion to torsional resistance, as compared to the solid neck of Fig. 5. In Figs. 6 and 7 the spring is shown as subdivided into four equal parts. However other forms of subdivision may be resorted to, e.g. a greater or lesser number of parts, all of which need not be equal in transverse cross section depending upon the response required.

While any suitable pickoff may be employed for converting the angular displacement of the gyroscope into a controlling impulse, we prefer to utilize an E–I pickoff comprising an armature 31 carried on a bracket 30 attached to the housing 10, and a stator 32 including the windings 33, 34 and 35. Inasmuch as the principles of operation of a pickoff of this type are well known, no elaboration thereof will be set forth beyond stating that angular movement of the armature is effective to vary the magnitude of the flux threading the core at a rate depending upon the angular velocity of displacement of the gimbal. And, depending upon whether rotation of the armature is clockwise or counterclockwise, the output will be greater from one of the coils 33 or 35 than from the other.

By proper choice of flux density the gap between the armature and the pole pieces of the stator may be made extremely small, and the response of the pickoff made almost exactly linear with respect to the angle through which the gimbal is rotated, i.e. for small angles of displacement $\sin \theta \cong \theta$. To attain this requirement, and to provide equal output for both sides of the pickoff requires careful setting of the gap at each side of the pickoff and means are therefore provided for micrometric adjustment of the armature.

Figure 4:
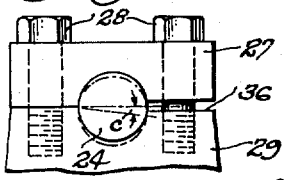
Fig. 4 shows a somewhat magnified detail of the adjusting means for the armature of the pickoff.

Turning to Fig. 4 it will be seen that while one side of the clamping block 27 is abutted with the post 29, the other side is spaced away therefrom, as indicated at 36. Consequently upon tightening the screw 28 individual to the gap 36 the head 24 may be rotated a minute amount, e.g. as shown by angle C, to effect adjustment of the gaps of the pickoff. Such result is made possible by fabricating the post 29 of material which is penetrable by the head 24, so that in effect the latter is forced into the post. It will be understood that provision is made for coarse adjustment of the gaps, e.g. by means of the screws by which the bracket 30 is attached by axial movement of the coils, or otherwise, and that the fine adjustment described in connection with Fig. 4 is of a micrometric nature only.

Figure 9:
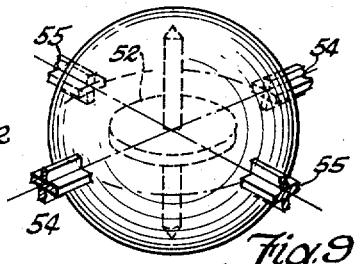
Fig. 9 is a diagrammatic showing of a further modification of the invention.
Figure 3:
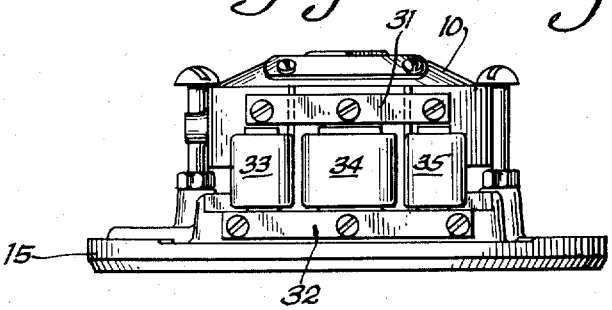
Fig. 3 shows a right side-elevational view thereof.
Figure 8:
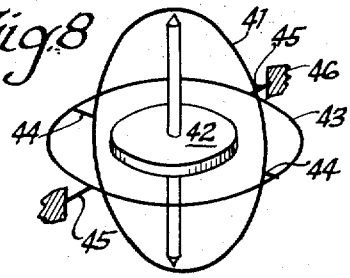
Fig. 8 is a diagrammatic representation showing an embodiment of the invention in a gyroscope having more than one gimbal.

From the foregoing it will have been comprehended that the invention is not to be regarded as limited to the support of the single gimbal, i.e. housing, of a rate gyroscope of its frame, but is capable of being embodied in the mounting of one gimbal upon another, e.g. as shown in Fig. 8, in which a gimbal ring 41 upon which the rotor 42 is carried is, in turn, supported on another gimbal ring 43. The supports 44—44 between the two gimbals and the supports 45—45 between the ring 43 and the framework 46 are constructed in accordance with the principles of the invention, i.e. characterized by torsional deformability in the direction of angular movement and stiffness in the direction of lateral displacement. Moreover if it is desired to incorporate the fundamentals of the invention in an instrument for sensing the forces and hence the rate of angular displacement about two axes simultaneously the embodiment of Fig. 9 may be resorted to. In this figure the rotor 52 is supported in a housing or gimbal 53, here illustrated for convenience as spherical, and the latter is semi-rigidly carried on torsionally deformable members 54—54 and 55—55. In order that rate of angular displacement may be sensed simultaneously about two axes the respective principal axes of the members are positioned in the same plane, and that plane may correspond to the mid-plane transverse to the rotor axis. However torsional deformability of one pair, e.g. 55—55 must correspond to lateral deflection of the other pair 54—54, and vice versa. Hence members in the form of flat plates are preferred, and are arranged in intedigitated pairs as shown, the respective ends of the cooperative pairs being secured to the gimbal or fixed framework as the case may be. Thus torsional action about a selected axis is accompanied by lateral rigidity, regardless of the pair of supports then in action.

While we have shown particular embodiments of our invention, it will be understood, of course, that we do not wish to be limited thereto since many modifications may be made, and we therefore contemplate by the appended claims to cover any such modifications as fall within the true spirit and scope of our invention. *It is apparent, however, that in order to accomplish the objects of the invention, at least one torsionally deformable member must be employed.*

Having thus described our invention, what we claim and desire to secure by Letters Patent is:

1. A gyroscope comprising a framework, a gimbal, a rotor mounted in said gimbal, means for rotating said rotor, and means for supporting said gimbal on said framework, including a pair of primarily torsionally deformable axially aligned rods respectively secured at their ends between said gimbal and framework at opposite sides thereof, said rods possessing the same degree of lateral deformability but different degrees of torsional deformability.

2. A gyroscope in accordance with claim 1 further characterized by an electrical pickoff, including a fixed part and a movable part, the movable part of the pickoff being secured to one side of the gimbal and the fixed part thereof being secured to the framework, the stiffer one of the said rods being positioned adjacent said one side of the gimbal.

3. A gyroscope comprising a framework, a gimbal, a rotor mounted in said gimbal, means for rotating said rotor, and means for supporting said gimbal for limited angular displacement about an axis perpendicular to the axis of the rotor comprising a pair of coaxial members positioned at opposite sides of the gimbal, each said member having an enlargement at one end and a shank at the other, said gimbal having means for clamping said enlargement and said framework having means for clamping said shank, said members having a portion of reduced transverse cross section intermediate said enlargement and shank which is torsionally deformable in a predetermined degree depending upon the torque applied to displace the housing about the axis of said members, said enlargement providing portions for adapting said reduced portions to a clamping type of mounting of practical proportions.

4. A gyroscope in accordance with claim 3 in which the reduced portion of one member is of less transverse area than the other but the physical characteristics of both members are otherwise essentially the same.

5. A gyroscope having a rotor, a gimbal upon which said rotor is carried for rotation, a framework, and a pair of members, one disposed at each end of a common axis upon which said gimbal is adapted to rotate, each member comprising a plurality of parallelly disposed torsionally deformable elements of quadrantal transverse cross-section, the spring constant of one of said members being greater than the other, and electrical pickoff means adjacent that end thereof with which the member having the greater spring constant is associated, the movable portion of the pickoff being carried on the gimbal and the fixed portion thereof being mounted on the framework.

6. A gyroscope comprising a framework, a housing, a rotor supported for rotation in said housing, means for rotating said rotor, means for supporting said housing on said framework in a semi-rigid manner including a pair of axially aligned, torsionally deformable members secured between the housing and framework, one of said members having a greater spring constant than the other, and a pickoff adjacent said member of greater spring constant for translating angular displacement of the housing into an electrical signal, one element of the pickoff being secured to said housing, and the other element thereof being secured to said framework.

7. A gyroscope comprising a framework, a gimbal, a rotor supported for rotation in said gimbal, means for rotating said rotor, means for supporting said gimbal on said framework in a semi-rigid manner, including a pair of members having a common axis perpendicular to the axis of the rotor, said members being torsionally deformable about their axis but essentially laterally non-deformable, the torsional spring constant of one of said members being greater than that of the other.

8. A gyroscope comprising a frame, a rotor, a gimbal upon which said rotor is carried for rotation, a pair of members upon which said gimbal is supported upon an axis for limited angular movement, each said member including a support flange at one end thereof and a head at the other end thereof and a plurality of torsionally deformable, substantially axially extending, elongated elements therebetween, and means for securing said flange and head to said gimbal and frame respectively and on each side of said gimbal for support thereof.

*9. A gyroscope comprising a framework, a gimbal, a rotor mounted in said gimbal, means for rotating said rotor, and means for supporting said gimbal for limited angular displacement about an axis perpendicular to the axis of the rotor comprising at least one member having an enlargement at one end and a head at the other, said gimbal having means for clamping said enlargement and said framework having means for clamping said head, said member having a portion of reduced transverse cross section intermediate said enlargement and said head which is torsionally deformable in a predetermined degree depending upon the torque applied to displace the gimbal about the axis of said member.*

*10. A gyroscope comprising a framework, a gimbal, a rotor mounted in said gimbal, means for rotating said rotor, and means for supporting said gimbal for limited*

*angular displacement about an axis perpendicular to the axis of the rotor comprising a pair of coaxial members positioned at opposite sides of the gimbal, at least one of said members having an enlargement at one end and a head at the other, said gimbal having means for clamping said enlargement and said framework having means for clamping said head, said member having a portion of reduced transverse cross section intermediate said enlargement and said head which is torsionally deformable in a predetermined degree depending upon the torque applied to displace the gimbal about the axis of said member.*

*11. For use in a gyroscope mounting, a gimbal-support member comprising a flange and a head spaced therefrom and joined thereto by an elongated neck of reduced cross section, said neck being torsionally deformable in a predetermined degree depending upon the torque applied between said flange and said head about the axis of said neck, said flange and said head being adapted to be clamped, respectively, to portions of a gyroscope adapted for limited relative rotational movement, said neck comprising a plurality of parallel, torsionally deformable elements, each having a sectoral cross section.*

*12. The gyroscope of claim 9, said enlargement and said head being cylindrical, said intermediate portion comprising a plurality of strips extending between said enlargement and said head.*

References Cited in the file of this patent or the original patent

UNITED STATES PATENTS

| | | |
|---|---|---|
| 2,238,380 | Almen | Apr. 15, 1941 |
| 2,291,612 | Draper | Aug. 4, 1941 |
| 2,409,178 | Allison | Oct. 15, 1946 |
| 2,484,823 | Hammond | Oct. 18, 1949 |
| 2,511,178 | Roters | June 13, 1950 |
| 2,588,018 | Lauenstein | Mar. 4, 1952 |
| 2,606,447 | Boltinghouse | Aug. 12, 1952 |

FOREIGN PATENTS

| | | |
|---|---|---|
| 200,833 | Great Britain | Oct. 4, 1923 |
| 124,508 | Australia | June 19, 1947 |